(12) United States Patent
Song et al.

(10) Patent No.: US 12,450,038 B2
(45) Date of Patent: Oct. 21, 2025

(54) GENERATION OF GRAPHICAL USER INTERFACE PROTOTYPES

(71) Applicant: International Business Machines Corporation, Armonk, NY (US)

(72) Inventors: Yuan Jie Song, Shanghai (CN); Xiao Feng Ji, Shanghai (CN); Dan Zhang, Shanghai (CN); Jun Qian Zhou, Shanghai (CN); Meng Chai, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 17/515,917

(22) Filed: Nov. 1, 2021

(65) Prior Publication Data
US 2023/0138367 A1    May 4, 2023

(51) Int. Cl.
| | |
|---|---|
| G06F 8/38 | (2018.01) |
| G06N 3/045 | (2023.01) |
| G06N 3/0475 | (2023.01) |
| G06N 3/088 | (2023.01) |

(52) U.S. Cl.
CPC ............. *G06F 8/38* (2013.01); *G06N 3/045* (2023.01); *G06N 3/0475* (2023.01); *G06N 3/088* (2013.01)

(58) Field of Classification Search
CPC ........ G06F 8/38; G06N 3/045; G06N 3/0475; G06N 3/088; G06N 3/08; G06N 3/044; G06N 3/047; G06N 3/084
See application file for complete search history.

(56) References Cited

U.S. PATENT DOCUMENTS

| | | | |
|---|---|---|---|
| 10,504,268 B1 * | 12/2019 | Huang | G06V 10/772 |
| 11,366,963 B1 * | 6/2022 | Morrison | G06F 40/186 |
| 2007/0130529 A1 | 6/2007 | Shrubsole | |
| 2019/0250891 A1 | 8/2019 | Kumar et al. | |

(Continued)

FOREIGN PATENT DOCUMENTS

| | | |
|---|---|---|
| CN | 101005681 A1 | 7/2007 |
| CN | 102043582 B | 12/2012 |

OTHER PUBLICATIONS

Kevin Moran et al.; Automatic Generation of Graphical User Interface Prototypes from Unrestricted Natural Language Requirements; IEEE Transactions on Software Engineering; Jun. 7, 2018.

(Continued)

*Primary Examiner* — Jeanette J Parker
(74) *Attorney, Agent, or Firm* — CANTOR COLBURN LLP; Teddi Maranzano

(57) ABSTRACT

A method of generating a prototype of a graphical user interface (GUI). The method includes acquiring a draft wireframe representing a GUI design, the draft wireframe including one or more wireframe components, and decomposing the draft wireframe into one or more component slices, each component slice including a respective wireframe component of the one or more wireframe components. The method also includes generating a component slice sequence including the one or more component slices and at least one additional component slice selected based on the draft wireframe, constructing a wireframe based on the component slice sequence, and generating a prototype of the GUI design based on the constructed wireframe.

12 Claims, 10 Drawing Sheets

(56) References Cited

U.S. PATENT DOCUMENTS

| | | | | |
|---|---|---|---|---|
| 2019/0317739 | A1* | 10/2019 | Turek | G06N 3/045 |
| 2020/0151508 | A1* | 5/2020 | Yang | G06V 10/82 |
| 2021/0303886 | A1* | 9/2021 | Hassan | G06N 3/045 |
| 2021/0406673 | A1* | 12/2021 | Pardeshi | G06F 3/04815 |
| 2023/0106159 | A1* | 4/2023 | Morrison | G06F 40/186 |
| | | | | 715/745 |

OTHER PUBLICATIONS

Kevin Moran et al.; Machine Learning-Based Prototyping of Graphical User Interfaces for Mobile Apps; IEEE Transactions on Software Engineering; Jun. 7, 2018.

Nick Babich; Wireframing Automation and Artificial Intelligence for UX Design; Adobe; Apr. 16, 2020.

Tianming Zhao et al.; GUIGAN: Learning to Generate GUI Designs Using Generative Adversarial Networks; arXiv; Jan. 27, 2021.

Bao et al., "Tracking and analyzing cross-cutting activities in developers' daily work", In Proceedings of the 2015 30th IEEE/ACM International Conference on Automated Software Engineering, IEEE, 2015, pp. 277-282.

Chen et al., "From UI design image to GUI skeleton: A neural machine translator to bootstrap mobile GUI implementation.", In Proceedings of the 40th International Conference on Software Engineering. ACM, May 27-Jun. 3, 2018, pp. 665-676.

Deka et al., "Rico: A mobile app dataset for building data-driven design applications", In Proceedings of the 30th Annual ACM Symposium on User Interface Software and Technology. ACM, Oct. 2017, pp. 845-854.

Kumar et al., "Webzeitgeist: Design mining the web", In Proceedings of the SIGCHI Conference on Human Factors in Computing Systems. ACM, 2013, pp. 3083-3092.

Ritchie et al., "d.tour: Style-based exploration of design example galleries", In Proceedings of the 24th Annual ACM Symposium on User Interface Software and Technology. ACM, 2011, pp. 165-174.

Yu et al., "SeqGAN: Sequence Generative Adversarial Nets with Policy Gradient", https://arxiv.org/pdf/1609.05473, Aug. 2017, 11 pages.

* cited by examiner

GENERATION OF GRAPHICAL USER INTERFACE PROTOTYPES

BACKGROUND

The present disclosure relates to graphical user interfaces, and more specifically, to methods, systems and computer program products for prototyping graphical user interfaces.

Graphical user interface (GUI) prototyping is the process of designing an optimal experience for target users. Prototyping includes various stages that help users such as designers, product owners, or business analysts to determine key concerns, including user needs, navigation, information architecture, usability, accessibility, and/or visual design.

SUMMARY

Embodiments of the present invention are directed to a method of generating a prototype of a graphical user interface (GUI). The method includes acquiring a draft wireframe representing a GUI design, the draft wireframe including one or more wireframe components, and decomposing the draft wireframe into one or more component slices, each component slice including a respective wireframe component of the one or more wireframe components. The method also includes generating a component slice sequence including the one or more component slices and at least one additional component slice selected based on the draft wireframe, constructing a wireframe based on the component slice sequence, and generating a prototype of the GUI design based on the constructed wireframe.

Embodiments of the present invention are directed to a system for generating a prototype of a graphical user interface (GUI). The system includes comprising one or more processors for executing computer-readable instructions, the computer-readable instructions controlling the one or more processors to perform operations that include acquiring a draft wireframe representing a GUI design, the draft wireframe including one or more wireframe components, and decomposing the draft wireframe into one or more component slices, each component slice including a respective wireframe component of the one or more wireframe components. The operations also include generating a component slice sequence including the one or more component slices and at least one additional component slice selected based on the draft wireframe, constructing a wireframe based on the component slice sequence, and generating a prototype of the GUI design based on the constructed wireframe.

Embodiments of the present invention include a computer program product including a tangible storage medium readable by a processing circuit and storing instructions for execution by the processing circuit for performing a method that includes acquiring a draft wireframe representing a GUI design, the draft wireframe including one or more wireframe components, and decomposing the draft wireframe into one or more component slices, each component slice including a respective wireframe component of the one or more wireframe components. The method also includes generating a component slice sequence including the one or more component slices and at least one additional component slice selected based on the draft wireframe, constructing a wireframe based on the component slice sequence, and generating a prototype of the GUI design based on the constructed wireframe.

Other embodiments of the present invention implement features of the above-described apparatus as a method of configuring the apparatus.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
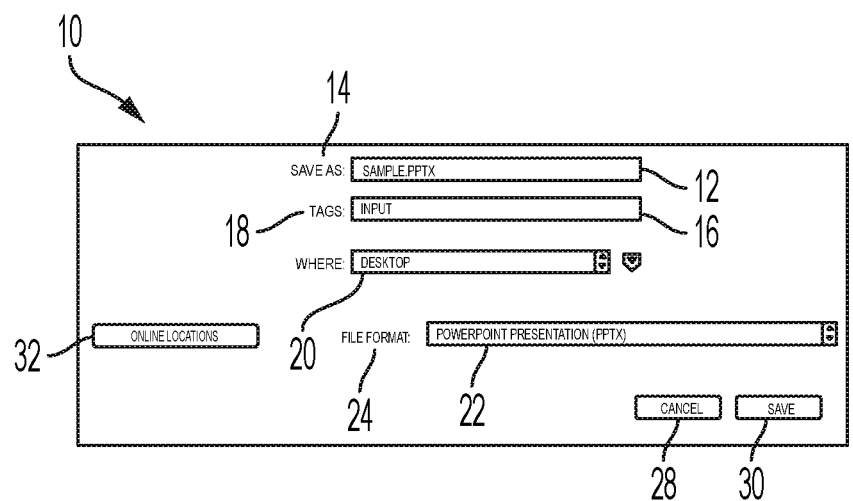
FIG. 1 depicts an example of a wireframe.

In accordance with exemplary embodiments of the invention, methods, systems and computer program products for user interface prototyping are provided. An embodiment of a method of generating a graphical user interface (GUI) prototype includes acquiring a draft wireframe representing a GUI design, which includes one or more wireframe components. The draft wireframe, which may be drawn or otherwise created by a user, includes wireframe components (e.g., buttons, labels, text fields, etc.) desired by the user.

In accordance with exemplary embodiments, the draft wireframe is decomposed by a decomposing processing module or other processing unit into a sequence of GUI component slices. A component slice is a representation of a single wireframe component (or group of components), which includes a transparent area (canvas) on which the wireframe component is located. Each component slice, in an embodiment, includes one of the wireframe components drafted and input by the user via the draft wireframe. A wireframe component may include any number of visual elements, including textual and graphical elements.

In an embodiment, the component slice sequence includes a component slice for each wireframe component drafted by the user, and also includes at least one additional component slice created based on the desired functionality of the GUI design. For example, a draft wireframe representing a search page may include components for a search field and a search button. Additional wireframe components such as labels, a cancel button and others are selected and incorporated as component slices based on the function identified for the design (i.e., searching).

Based on the generated component slice sequence, a wireframe is constructed (e.g., by stacking and merging the component slices). The wireframe may then be used to generate a prototype by adding style features such as color and images.

In an embodiment, constructing the wireframe and/or generating the prototype is based on a machine learning or artificial intelligence (AI) model. The machine learning model may be an unsupervised model such as a generative adversarial network. For example, the constructed wireframe is generated via a GUI wireframe generative adversarial network (GWGAN), which includes a generator configured to generate a component slice sequence and a reconstructor configured to construct a wireframe from the sequence, each of which are trained with training data using a respective discriminator.

Embodiments described herein provide for a number of advantages and technical effects. The embodiments provide for a process of prototype generation that can simplify, accelerate, and improve efficiency of prototyping. For example, a designer or other user can draw fewer than all of the components that would be needed or desired for a given design instead of designing all components, and embodiments of the system can automatically complete the user's initial draft by supplying more valid components and then generating a real-looking and rational prototype.

FIG. 1 depicts an example of a wireframe 10 and illustrates examples of GUI wireframe components. A "wireframe" is a two-dimensional simplified representation of a GUI display screen. The wireframe illustrates the structure, layout and functionality of a display screen design. Wireframes typically eliminate or minimize images, color, graphics and other design elements that do not impose specific functionality. A wireframe may include one or more GUI wireframe components, such as labels, buttons and text fields.

In this example, the wireframe 10 has the intended function of saving data (save function), and includes a text field 12 and "Save As" text 14, a text field 16 and "Tags" text 18, a drop down menu 20 for save location, a file format drop down menu 22 and associated text 24. The wireframe 10 also includes action buttons 28 and 30 (cancel and save), and an "Online Locations" button 32.

In an embodiment, a wireframe component can include multiple textual and/or graphical elements, such as an image or graphic of a non-textual component and accompanying text. For example, the Save As text 14 and the text field 12 may be considered a single component, and the Tags text 18 and the drop down menu 16 may also be considered a single component.

The wireframe 10 can be decomposed into individual component slices. Each component slice represents an area corresponding to the display area of the wireframe (based on a desired platform) and includes one of the above components. It is noted that, although components slices are discussed herein as having one component, they are not so limited, as a component slice may include more than one component.

Figure 2:
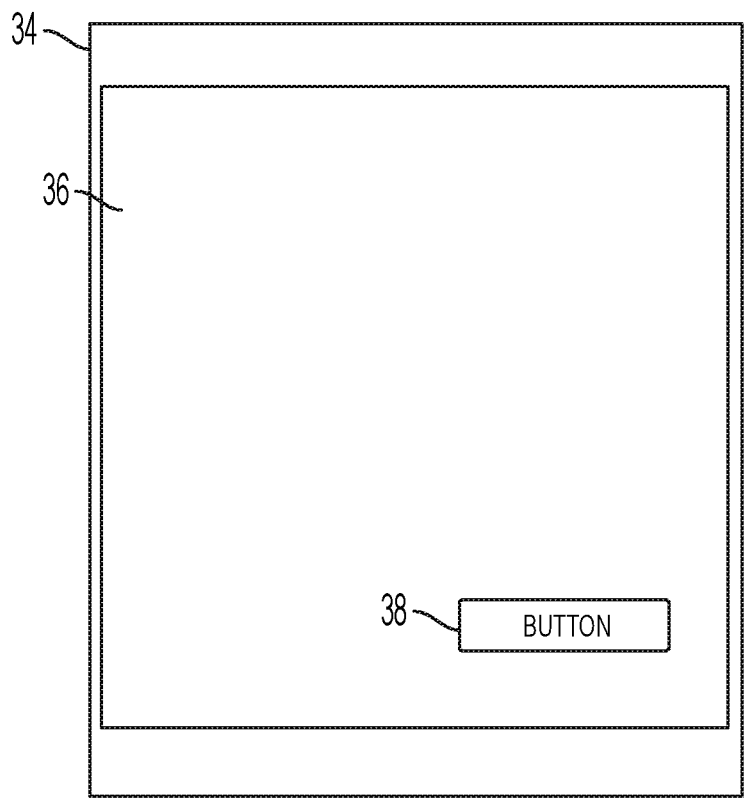
FIG. 2 depicts an example of a component slice generated by deconstructing a wireframe, according to one or more embodiments.

FIG. 2 depicts an example of a GUI component slice 34. A "component slice" is a representation of a component and a location of the component in a GUI design, and includes a transparent canvas with a size and dimension associated with a display screen of a specified platform (e.g., desktop or mobile) and a single non-transparent wireframe-style GUI component. In an embodiment, a GUI component is represented as an image and may include related text. For example, a GUI component 38 is shown located on a transparent canvas 36 and positioned according to platform, which includes an image of a button and related text. Each component slice may be stored as a one-hot encoding vector referred to as a "GUI-component-slice vector". In an embodiment, a component slice may be configured as a "blank slice," which includes a transparent canvas (with platform size) without any GUI components.

Figure 3:
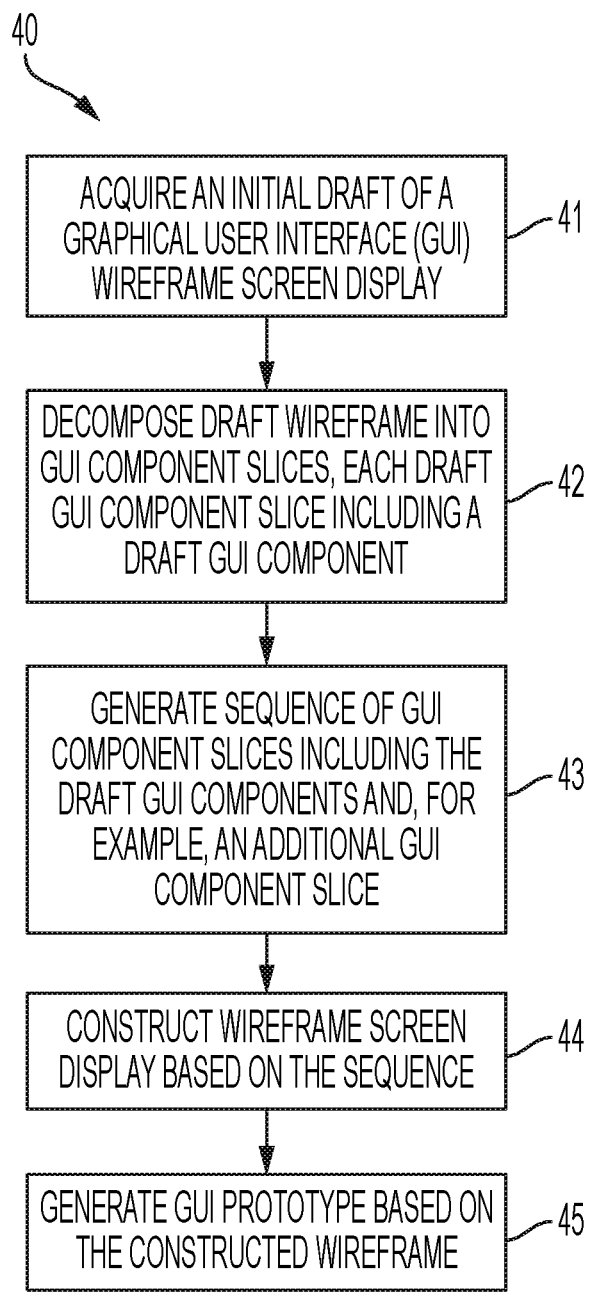
FIG. 3 is a block diagram of an embodiment of a method of generating a graphic user interface (GUI) prototype, which includes decomposing a draft wireframe input by a user, generating a sequence of GUI component slices, constructing a wireframe based on the sequence, and generating a GUI prototype based on the constructed wireframe.

FIG. 3 depicts an embodiment of a method 40 of generating wireframes and/or generating GUI prototypes. The method 40 includes a number of stages, aspects of which are represented by blocks 41-45. The stages may be performed in the order described, or one or more stages may be performed in a different order. In addition, the method 40 may include fewer than all of the stages. Aspects of the method 40 may be performed by any suitable processing device or system, or be performed by a processing device or system in conjunction with a user.

At block 41, an initial draft of a wireframe of a GUI screen display ("draft wireframe") is acquired. For example, a user inputs a drawing, sketch or other representation of a GUI page design.

At block 42, a decomposing processing module decomposes the draft wireframe into constituent GUI components (e.g., via image analysis and/or classification), and then into one or more GUI component slices. Each component slice represents a GUI component. Each GUI component slice includes a blank region (canvas) and an image of a GUI component as the GUI component is to be located in a GUI design. The draft wireframe can be deconstructed using various types of analyses. For example, an image analysis module may be included to recognize features such as text boxes and buttons, and optical character recognition may be used to recognize textual components.

At block 43, a sequence of GUI component slices is generated by grouping each of the GUI component slices. In an embodiment, generating the sequence includes adding one or more additional GUI component slices. A component slice may be selected and added based on the function or functions associated with the GUI design. For example, a user inputs a function or functions, and the processing device selects one or more additional stored component slices based on the function. As described further below, in an embodiment, a machine learning model such as a generative adversarial network (GAN) adds component slices based on previous learning using training data in the form of pre-existing wireframes and designs.

At block 44, the sequence is combined to generate a constructed wireframe that incorporates all of the GUI components. The constructed wireframe thus includes components specified by a user, along with additional components that the user did not input, but which would be beneficial or needed to facilitate the function(s) specified by the user.

At block 45, a GUI prototype is created based on the constructed wireframe. As part of creating the prototype, elements including color, logos, pictures, video and other design elements may be added.

In an embodiment, the method 40 utilizes one or more machine learning image generation models configured to facilitate the generation of constructed wireframes and/or GUI prototypes. The models may be generative adversarial networks (GANs). The models perform functions such as decomposing wireframe drafts (wireframe-to-slice decomposing), constructing wireframes (slice-to-wireframe reconstruction) and/or generating prototypes based on constructed wireframes.

In an embodiment, constructing a GUI wireframe is performed based on a GUI wireframe generative adversarial network (GWGAN), and generating the prototype is performed based on a GUI style generative adversarial network (GSGAN). The GSGAN model is an image generation model based on plain pixels which translates a GUI wireframe to a GUI prototype image with fine-grained component pixels, and is trained by a discriminator using wireframe training data (e.g., examples of pre-existing wireframes). The GWGAN model receives GUI component inputs, constructs GUI component slice sequences, and translates the sequences to constructed wireframes. The constructed wireframes may be input to the GSGAN model for generation of a prototype. The GWGAN model is trained using training data in the form of pre-existing component slice sequences and pre-existing wireframes.

Figure 4:
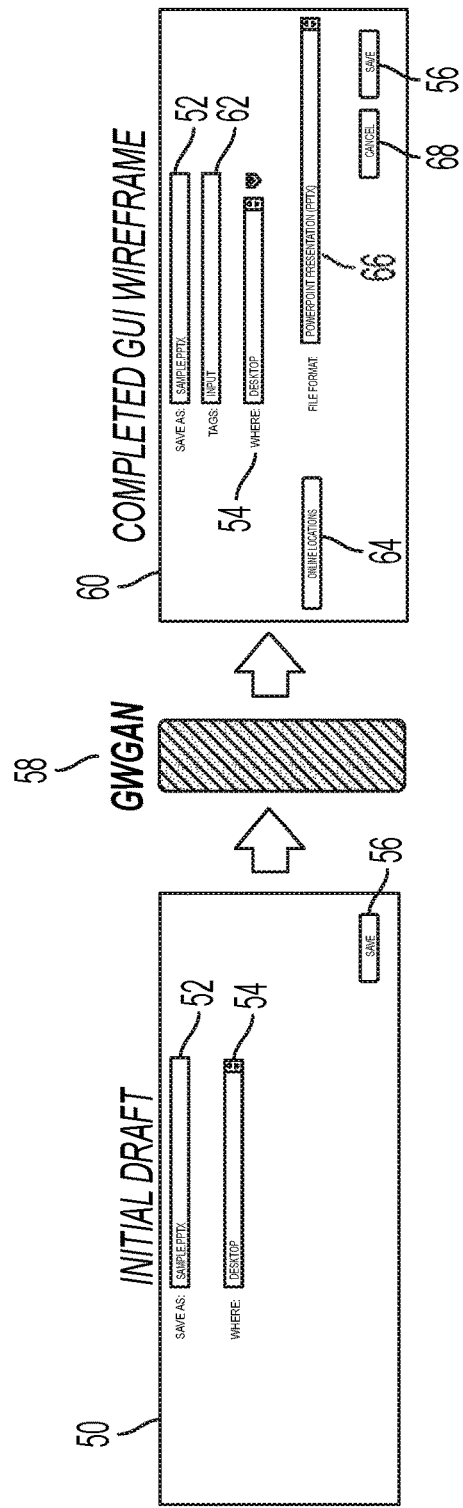
FIG. 4 depicts an example of constructing a wireframe according to the method of FIG. 3.
Figure 5:
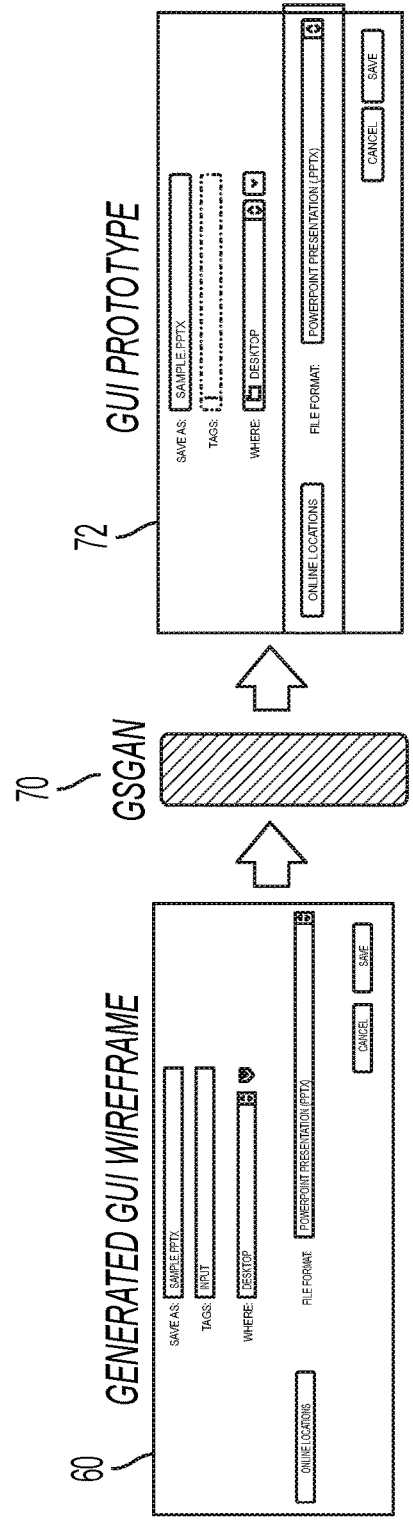
FIG. 5 depicts an example of generating a GUI prototype based on the constructed wireframe of FIG. 4.

An example of aspects of the method 40 is discussed in conjunction with an example shown in FIGS. 4 and 5. Referring to FIG. 4, an initial draft wireframe 50 is input by a user or other processor, which includes GUI components 52, 54 and 56. Additional input information may be provided, such as the platform (e.g., desktop platform or mobile platform) and a function (e.g., search, file-saving, etc.). The draft wireframe 50 is decomposed into a GUI component slice (not shown) for each of components 52, 54 and 56. The GUI component slices are input to a GWGAN model 58, which combines the slices according to the layout of each component (e.g., position of component in the slice, size of the component, etc.). The GWGAN model 58 may incorporate additional GUI components as discussed further herein.

In the example of FIG. 4, a constructed GUI wireframe 60 is generated, which includes the components 52, 54 and 56, as well as additional components 62, 64, 66 and 68. The GWGAN model 58 organizes all of the components (including decomposed slices and added slices) according to a rational layout derived from training data and learning. In this way, the composition of all components in a wireframe looks real and rational for the target platform and function. Referring to FIG. 5, the constructed wireframe 60 is input to a GSGAN model 70, which receives the constructed wireframe 60 and outputs a completed prototype 72. It is noted that the prototype can be generated using any of various image generation models.

Figure 6:
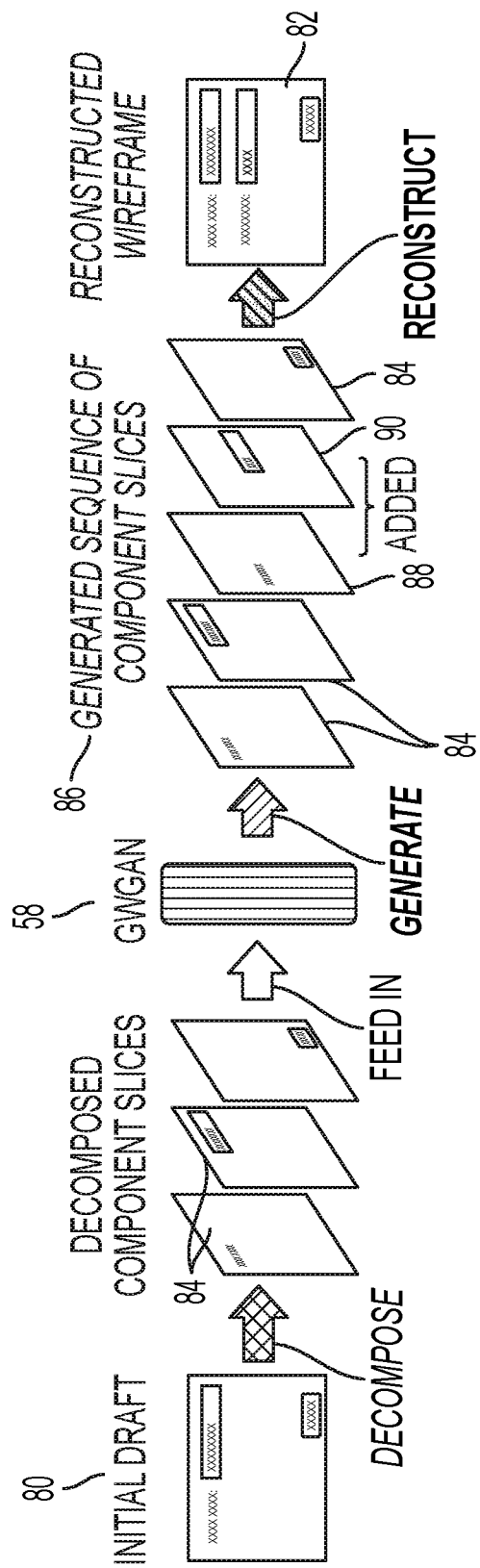
FIG. 6 depicts an example of constructing a wireframe according to the method of FIG. 3.

FIG. 6 depicts an example of decomposing a wireframe draft 80 into component slices and constructing a wireframe 82. The wireframe draft 80 is decomposed into component slices 84. The slices represent a "User Name" text, a text box and a Login button, respectively. The GWGAN model 58 receives the component slices 84, and generates a sequence 86, which includes the decomposed slices 84 and two additional slices 88 and 90, representing a textual element "Password" and a text box respectively. The component slices 84, 88 and 90 are stacked and merged in the order of the sequence 86 to construct the wireframe 82.

Figure 7:
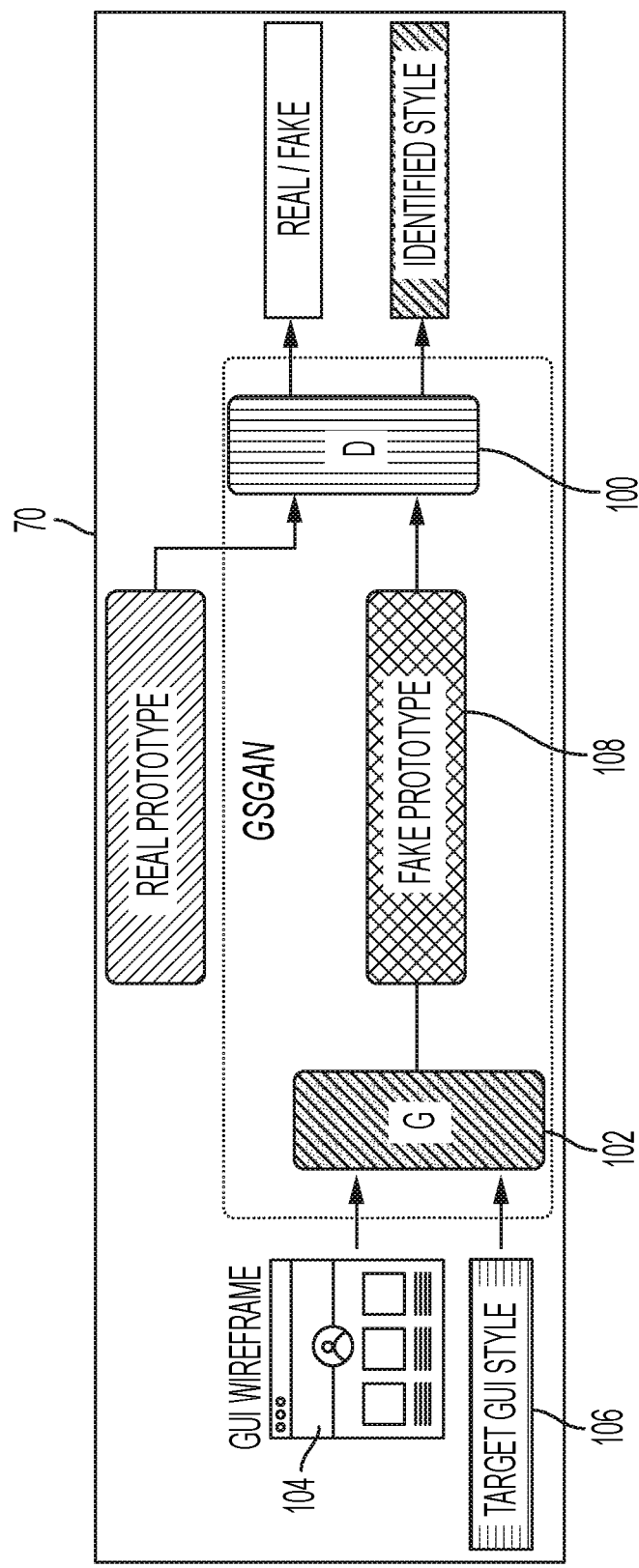
FIG. 7 is a block diagram representing an embodiment of a machine learning model configured to generate a GUI prototype based on a constructed wireframe.

FIG. 7 depicts an architecture of an embodiment of the GSGAN model 70. The GSGAN model 70 includes a discrimination module or discriminator 100, and a generation module or generator 102. The generator 102 takes in as input a GUI wireframe 104 constructed by the GWGAN model 58, and a GUI-style (one-hot encoding) vector 106 indicating which GUI style (e.g., UI style of Eclipse, VisualStudio Code or Pycharm) a generated GUI prototype image is expected to look like, and then generates a new GUI prototype 108 accordingly. The discriminator 100 takes in prototypes 108 generated by the generator 102 or UI screenshots from a training data set, and distinguishes between "real" and "fake" prototype images, and classifies the input's GUI style. The term "real" is intended to identify data relating to stored training data, and "fake" is intended to identify an output from a generator (e.g., the generator of the GSGAN model 70 or GWGAN model 58).

Figure 8:
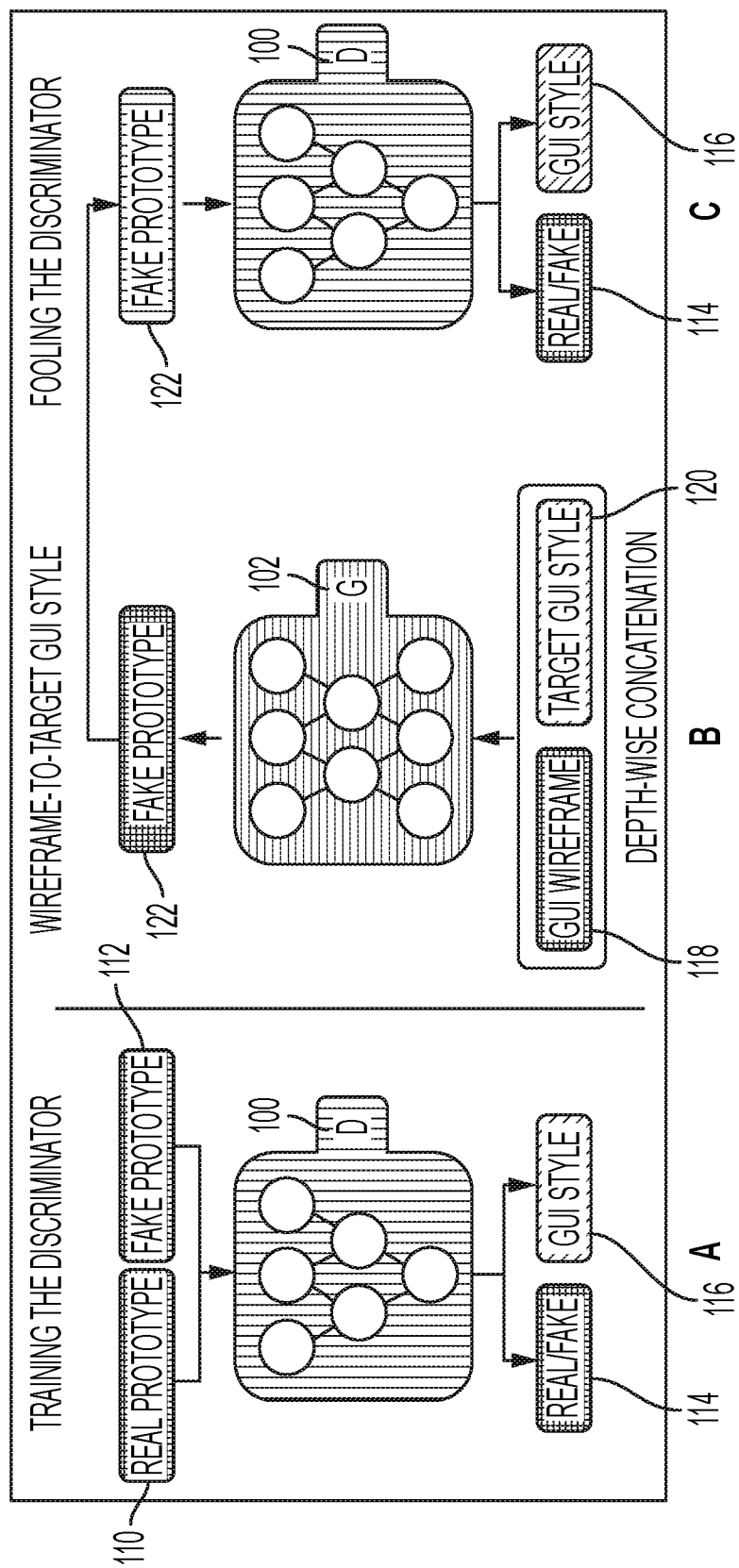
FIGS. 8A-8C depict aspects of training the model of FIG. 7, according to one or more embodiments.

Referring to FIGS. 8A-8C, the GSGAN model 70 is trained based on training data supplied to the model. Referring to FIG. 8A, the discriminator 100 learns to distinguish between a real GUI prototype image 110 and a fake GUI prototype image 112. The discriminator 100, based on image features, identifies an input prototype image (e.g., real prototype image 110 or fake prototype image 112) as real or fake, and outputs a real/fake indicator 114, and outputs a GUI style indicator 116. Referring to FIG. 8B, the generator 102 receives a GUI wireframe image 118, and a target GUI style 120, and then generates a fake prototype image 122. The target GUI style 120 (vector) is spatially replicated and concatenated with the input wireframe image 118. Referring to FIG. 8C, the generator 102 tries to "fool" the discriminator 100 by generating fine-grained prototype images that are indistinguishable from real ones and classifiable as the target GUI style by the discriminator 100. In this way, the generator 102 learns to generate accurate prototype images from received wireframes.

Figure 9:
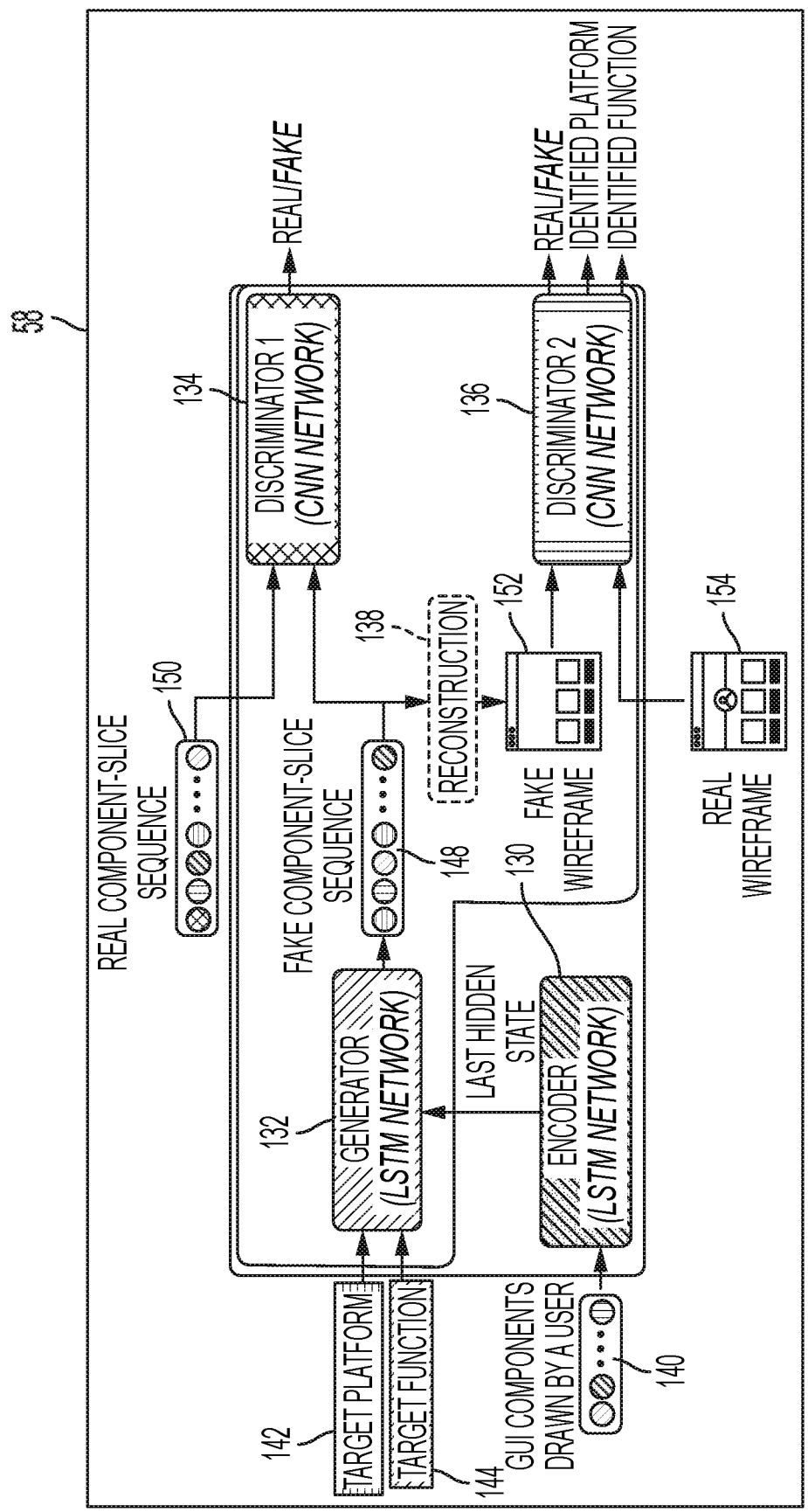
FIG. 9 is a block diagram representing an embodiment of a machine learning model configured to construct a wireframe based on a draft wireframe input by a user.

FIG. 9 depicts an architecture of an embodiment of the GWGAN model 58. The GWGAN model 58 includes an encoder 130, a generator 132 and a discriminative model having a first discriminator 134 and a second discriminator 136. The generator 132 is configured as a LSTM (Long Short-Term Memory) network, and the discriminators are each configured as a CNN with a highway structure. The GWGAN model 58 also includes a reconstruction module or reconstructor 138 for constructing wireframes from component sequences.

In use, a set of draft GUI components 140 (e.g., components decomposed from a user-supplied draft GUI screen, or a list of components drawn by a user) are input to the model 58, along with additional input information such as a target platform vector 142 and a target function vector 144.

The draft GUI components 140 are input to the encoder 130 (e.g., from a decomposing processing module), which uses a LSTM and takes in the set of GUI components 140, and represents each component as a component slice. The component slice may be stored as a GUI-component-slice (one-hot encoding) vector. The encoder's last hidden state is fed into the generator 132 that uses a LSTM to generate a component slice sequence, referred to as a generated or fake sequence.

In an embodiment, the LSTM includes hidden layers, each hidden layer having a hidden layer dimension n+a+b, where n is the hidden layer dimension of the encoder (n can be any value), a is the dimension of the target platform vector 142, and b is the dimension of the function vector 144. An input dimension of the generator 132 is m (that is, the dimension of the UI component slice vector). The output hidden state of each time step of the LSTM of the generator 132 is transformed into the dimension m through a Softmax layer in the generator 132.

The generator 132 takes in the target platform vector 142, the function vector 144 and the last hidden state from the encoder 130 as the generator's initial hidden state. The generator uses a LSTM to generate a sequence of component slices, referred to as a generated sequence or "fake" sequence 148.

Inputs to the generator 132 are thus a platform-category (one-hot encoding) vector, a function-category (one-hot encoding) vector, and the last hidden state of the encoder 130. These inputs are concatenated together as the initial hidden state of the generator 132. The generator 132 samples existing GUI-component slices (represented as vectors) to generate a new sequence.

The generated sequence 148, or a sequence 150 of "real samples" representing pre-existing components (e.g., in the training data) is fed to the discriminator 134. The discriminator 134 uses a convolutional neural network (CNN) with a highway structure, and distinguishes between real sequences and generated or fake sequences from the generator 132. The discriminator 134 updates parameters by distinguishing between real samples and generated samples from the generator 132, which belongs to a binary classification task. The generator 132 uses, for example, a Monte Carlo (MC) search reward process performed by the discriminator 134 and the discriminator 136 in combination with a policy gradient method to update its parameters.

The fake (or generated) sequence 148 is output by the generator 132 and input both to the discriminator 134 and to the reconstructor 138. The reconstructor 138 constructs a wireframe 152, which can then be fed to the GSGAN model 70 for generation of a prototype.

The constructed wireframe 152 is input to the discriminator 136, which distinguishes between real GUI wireframes (e.g., from training data) and constructed or "fake" wireframes. For example, the discriminator 136 receives the constructed wireframe 152 as a fake wireframe and/or receives a real wireframe 154 from training data. The discriminator 136 outputs a real/fake indicator, and identifies the target platform and function of the constructed wireframe 152.

Figure 10:
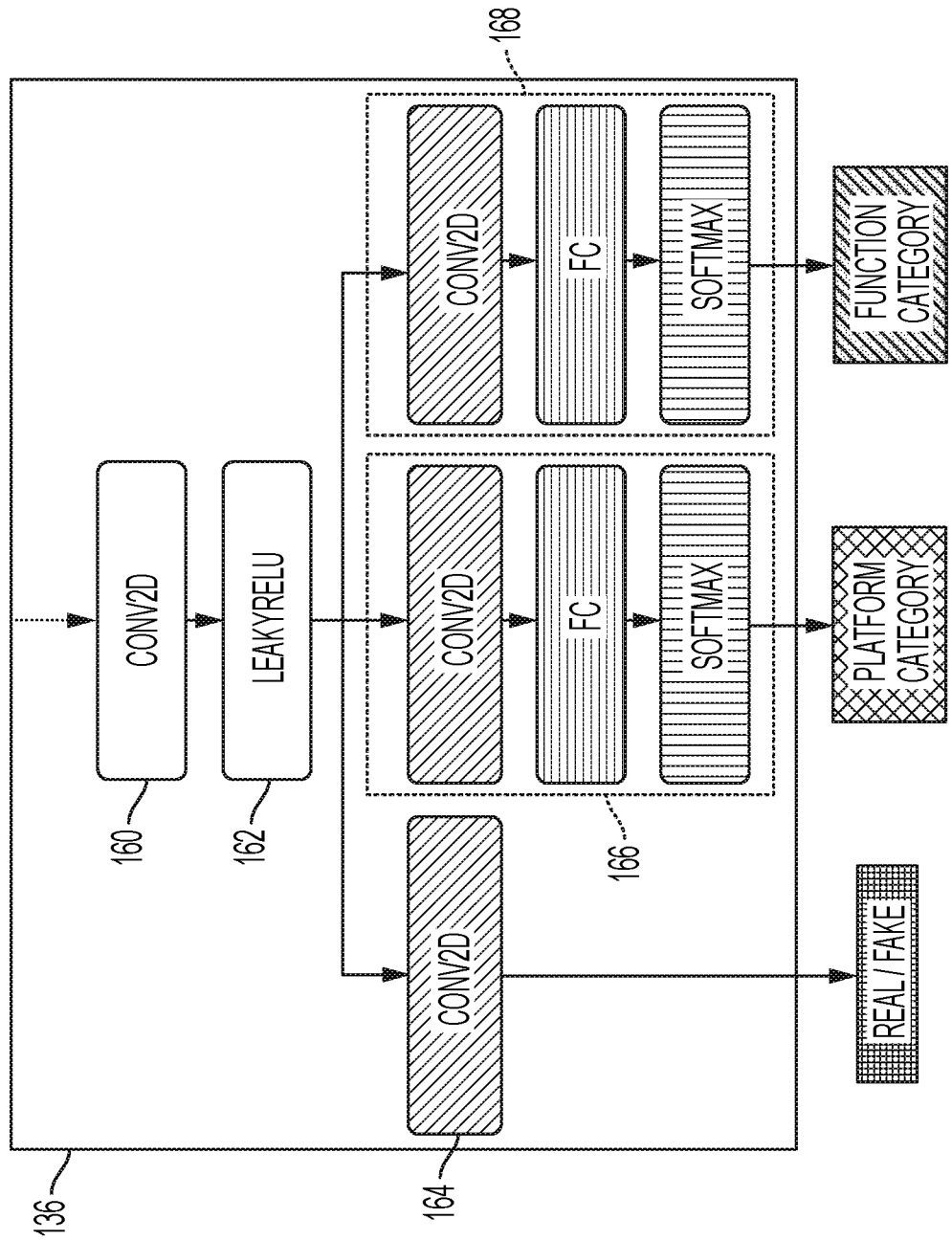
FIG. 10 depicts an embodiment of a discriminative model or discriminator incorporated in the model of FIG. 9

FIG. 10 illustrates a partial structure of the discriminator 136. As shown, the discriminator 136 includes a first two dimensional convolution (Conv2d) layer 160, and a leaky version of a rectified linear unit 162. The discriminator 136 includes a set of layers 166 for platform categorization, and a set of layers 168 for function categorization. Each set includes a Conv2d layer, a fully connected (FC) layer and a Softmax layer.

The GWGAN model 58, as noted above, is trained using training data that includes real samples of wireframes and GUI components. In an embodiment, the GWGAN model 58 is trained using a two-phase training method, which includes a pre-training process and an adversarial training process. It is noted that the training method may include all of the steps or stages discussed herein in the order described, or may include fewer than all of the steps. In addition, various steps may be performed in a different order than that described.

The pre-training process begins by training the encoder 130. The encoder 130 is replicated to obtain a decoder, and the replicated decoder is combined with the encoder 130 to compose a seq2seq model. A MLM (masked language model) task may be used to train this model based on sequences of GUI component slices from a training data set. Cross entropy loss and backpropagation may be used to update parameters of the seq2seq model. After the encoder 130 is fully trained, the decoder may be removed.

The generator 132 may be pre-trained using MLE (Maximum Likelihood Estimation) based on some or all of the sequences of GUI component slices from the training data set. Cross entropy loss and backpropagation may be used to update generator parameters. During pre-training, the generator 132 does not take in the last hidden state from the encoder or any platform/function category vector; thus, its initial hidden state is initialized to zeros.

The discriminator 134 may be pre-trained via minimizing the cross entropy based on a list of randomly-selected real sequences of GUI-component slices from the training data set and sequences generated by the pre-trained generator. Backpropagation may also be used to update the discriminator 134 parameters.

The discriminator 136 may be pre-trained via minimizing the cross entropy for its real/fake classification based on randomly-selected real GUI wireframes from the training data set and the reconstructed wireframes from sequences generated by the pre-trained generator 132. Cross entropy may be minimized for platform and function classifications based on the related platform and function category information from the training data set, which are in relation to those selected real GUI wireframes.

Figure 11:
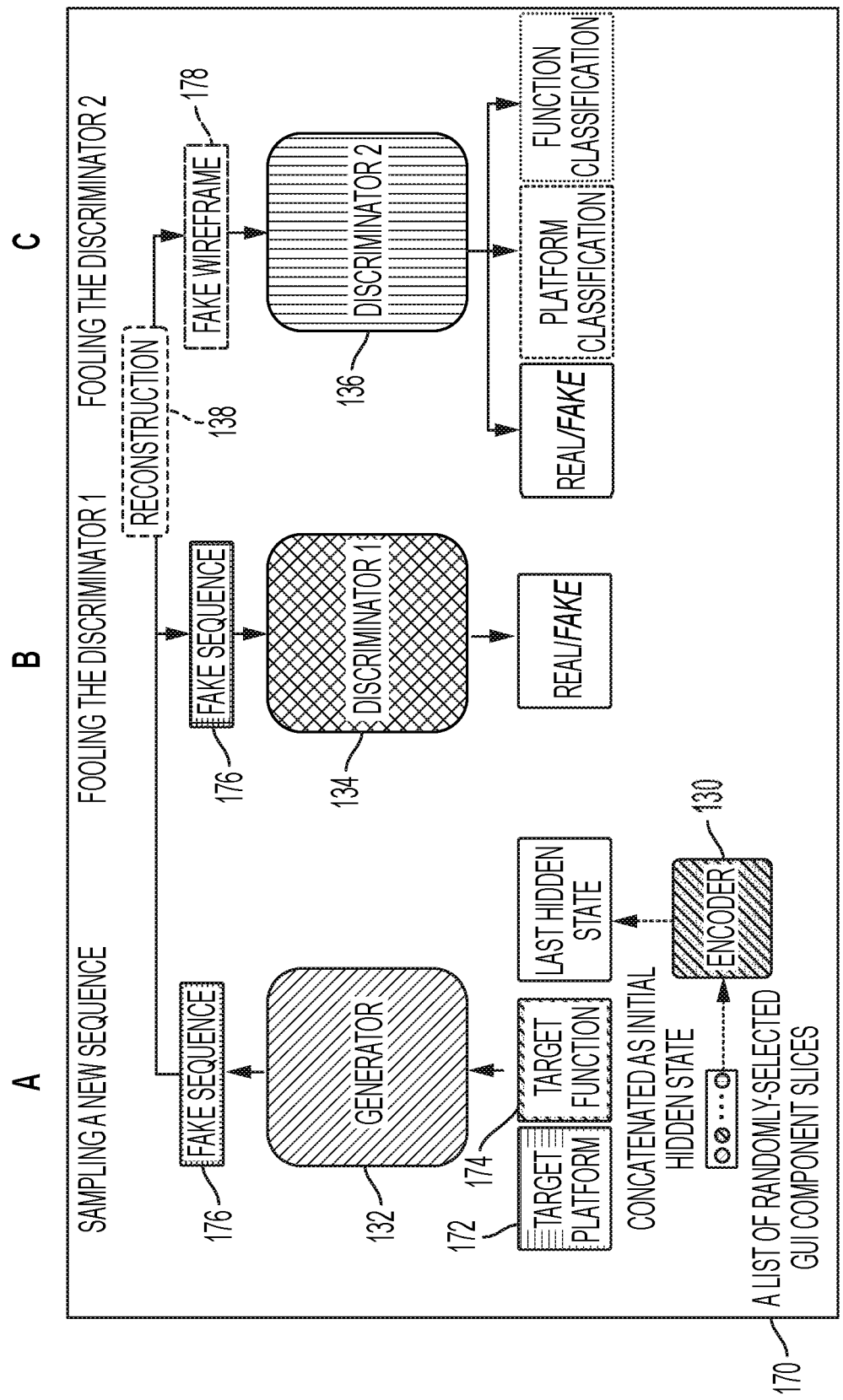
FIG. 11 is a block diagram representing aspects of training the model of FIG. 9, according to one or more embodiments.

Referring to FIGS. 11A-11C, the adversarial training process begins with the encoder receiving a list of random GUI component slices 170 with the same randomly-selected platform and function categories from the training data set. The list of component slices may belong to the same or different sequences. Then, as shown in FIG. 11A, the generator 132 concatenates the last hidden state of the encoder 130 and the target platform and function categories (represented as category vectors 172 and 174) as its initial hidden state and generates a fake sequence 176, which is expected to include the selected GUI component slices and match the target platform and function.

Referring to FIG. 11B, the generator 132 tries to generate component sequences 176 that are indistinguishable from real ones by the discriminator 134 (i.e., attempts to fool the discriminator 134). Referring to FIG. 11C, the generator 132 also tries to generate sequences 176 that will be reconstructed into GUI wireframe images (fake wireframes 178) that are indistinguishable from real ones and classifiable as target platform and function by the discriminator 136. The adversarial training process continues until the GWGAN model converges.

During adversarial training, the generator 132 is trained by policy gradient, where a final reward signal is provided by each discriminator and is passed back to an intermediate action value via Monte Carlo search. Below is an embodiment of an action-value function of a sequence used by the generator. In the following, D1 refers to the discriminator 134 (Discriminator 1) and D2 refers to the discriminator 136 (Discriminator 2).

For t<T:

$$Q_D^{G_\theta}(s = Y_{1:t-1}, a = y_t) =$$

-continued $$\frac{1}{N}\sum_{n=1}^{N}(a*D1_\phi(Y_{1:T}^n)+$$

$$b*D2_\gamma(Y_{1:T}^n)+c*D2_{platform_\gamma}(Y_{1:T}^n)+d*D2_{function_\gamma}(Y_{1:T}^n)$$

$$+e*(Count_{input\_component}/Total_{input\_component}))$$

For t=T:

$$Q_D{}^{G\theta}(s=Y_{1:t-1},a=y_t)=a*D1_\phi(Y_{1:t})+b*D2_\gamma(Y_{1:t})+\\c*D2_{platform_\gamma}(Y_{1:t})+d*D2_{function_\gamma}(Y_{1:t})+e*\\(Count_{input\_component}/Total_{input\_component}), \text{ where}$$

$$Y_{1:T}^n \in MC^{G\beta}(Y_{1:t};N).$$

The following are variables of the above function:

$Count_{input\_component}$ is the total number of randomly-selected input GUI component slices which are included in a sequence ($Y_{1:T}^n$). If one input component shows in such a sequence, then count one (if the same component is input more than once, that component is only counted once);

$Total_{input\_component}$ is the total number of randomly-selected input GUI component slices that the encoder takes in;

$D1_\phi(Y_{1:T}^n)$ is the estimated probability of a sequence being classified as real by the discriminator 134;

$D2_\gamma(Y_{1:T}^n)$ is the estimated probability of a fake wireframe (e.g., a fake wireframe 178) being classified as real by the discriminator 136;

$D2_{platform_\gamma}(Y_{1:T}^n)$ is the estimated probability of a fake wireframe (e.g., a fake wireframe 178) being classified as associated with a target platform by the discriminator 136;

$D2_{function_\gamma}(Y_{1:T}^n)$ is the estimated probability of a fake wireframe (e.g., a fake wireframe 178) being classified as associated with a target function by the discriminator 136; and a, b, c, d and e are hyper-parameters that control the relative importance of factors respectively, and a+b+c+d+e=1. Examples of hyperparameter values include a=0.2, b=0.1, c=0.1, d=0.1 and e=0.5.

In order to generate a training set, in an embodiment, a plurality of GUI samples are collected. The samples may be UI screenshots or any other representation of a GUI. For example, UI screenshots and associated metadata (e.g., type, size, coordinates and the composition of components) of GUI components. Related platform, UI style and function categories are identified (e.g., via automatic or manual recognition from the perspective of text semantics or images) and recorded automatically for each GUI screenshot.

Various techniques can be used for automatically explore the GUIs of mobile applications, web applications, or desktop applications. Such generally include simulating user interactions with an application and outputting the GUI screenshot images and the runtime visual component information that identifies each component's type and coordinates in the screenshots. During the GUI exploration process, the same GUIs may be repeatedly visited, but the duplicated screenshots can be discarded. Further heuristics can be implemented to filter out meaningless GUIs (e.g., the home screen of a mobile device, simple Us which only include one/two big component, and components generally not required by GUI prototypes).

Each collected UI screenshot may be transformed into a wireframe, i.e., may be "wirified," using a rule-based process. An examples of a process includes defining a set of wireframe components (e.g., from some existing wireframe component libraries) that are desired for GUI prototype generation. Each screenshot is wirified according to its associated metadata. The UI wireframe configured to have the same size as the screenshot and has a white canvas on which a wireframe component is drawn at the same position and of the same size as each corresponding visual component in the screenshot.

Each wireframe generated using the wirification process may then be sliced into a sequence of GUI component slices according to predefined traversal rules (including up-to-down, left-to-right and depth-first traversal) based on the composition (e.g., a DOM tree of a web page) of UI components and the collected metadata. Every component slice is mapped to a one-hot encoding vector. Duplicated GUI component slices may be discarded.

The built training data set can store various kinds of data. For example, the training data set stores UI screenshots, UI wireframes, metadata, GUI component slice images, sequences of GUI-component-slice vectors, GUI style categories, platform categories and function categories.

Figure 12:
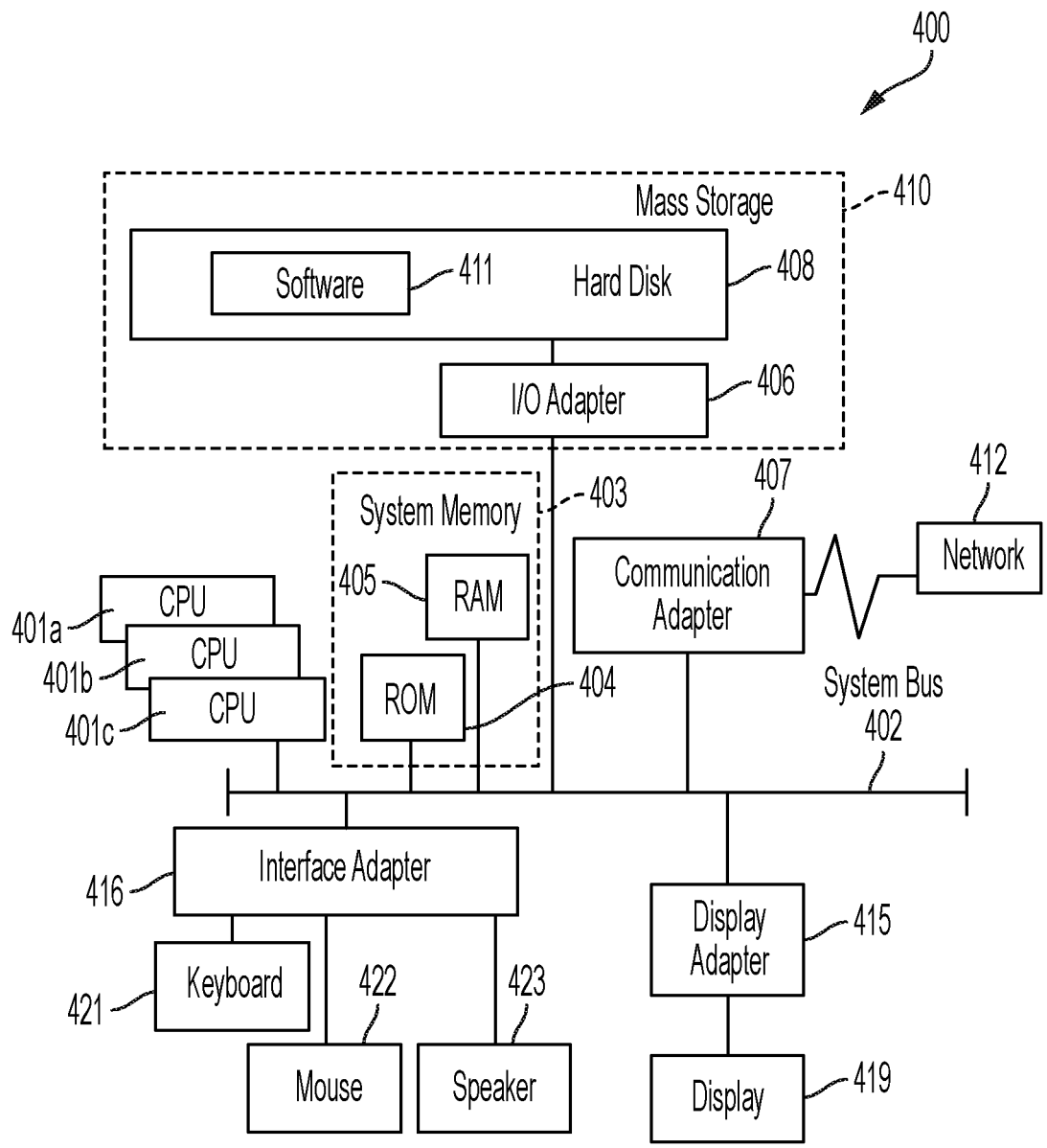
FIG. 12 is a block diagram illustrating an embodiment of a computer system configured to perform aspects of methods described herein.

Referring to FIG. 12, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 12.

Additional input/output devices are shown as connected to the system bus 402 via a display adapter 415 and an interface adapter 416. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 12 is not intended to indicate that the computer system 400 is to include all of the components shown in FIG. 12. Rather, the computer system 400 can include any appropriate fewer or additional components not illustrated in FIG. 12 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process detail.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of generating a prototype of a graphical user interface (GUI), comprising:
   acquiring a draft wireframe representing a GUI design, the draft wireframe including one or more wireframe components;
   decomposing the draft wireframe into one or more component slices, each component slice including a respective wireframe component of the one or more wireframe components;
   generating a component slice sequence including the one or more component slices and at least one additional component slice selected based on the draft wireframe;
   constructing a wireframe based on the component slice sequence; and
   generating a prototype of the GUI design based on the constructed wireframe,
      wherein the machine learning model is a generative adversarial model that includes a generator configured to generate the component slice sequence, the generator configured to be trained by a first discriminator and a second discriminator,
      wherein the first discriminator trains the generator based on discriminating between real component slice sequences from a training data set and component slice sequences output by the generator, and
      wherein the second discriminator trains the generator based on discriminating between real wireframes from the training data set and wireframes constructed from the component slice sequences output by the generator.

2. The method of claim 1, wherein the additional component slice is selected based on a target platform and a target function.

3. The method of claim 1, wherein generating the component slice sequence and constructing the wireframe is performed at least in part by a machine learning model.

4. The method of claim 1, wherein generating the component slice sequence and constructing the wireframe is performed at least in part by a GUI wireframe generative adversarial model (GWGAN) and generating the prototype is performed at least in part by a GUI style generative adversarial model (GSGAN).

5. A system for generating a prototype of a graphical user interface (GUI), the system comprising one or more processors and computer-readable instructions stored in tangible storage medium, the computer-readable instructions when executed by the one or more processors performs operations comprising:
   acquiring a draft wireframe representing a GUI design, the draft wireframe including one or more wireframe components;
   decomposing the draft wireframe into one or more component slices, each component slice including a respective wireframe component of the one or more wireframe components;
   generating a component slice sequence including the one or more component slices and at least one additional component slice selected based on the draft wireframe;
   constructing a wireframe based on the component slice sequence; and
   generating a prototype of the GUI design based on the constructed wireframe,
      wherein the machine learning model is a generative adversarial model, generating the component slice sequence is performed using a machine learning model including a generator, the generator configured to be trained by a first discriminator and a second discriminator,
      wherein the first discriminator is configured to train the generator based on discriminating between real component slice sequences from a training data set and component slice sequences output by the generator, and
      wherein second discriminator is configured to train the generator based on discriminating between real wireframes from the training data set and wireframes constructed from the component slice sequences output by the generator.

6. The system of claim 5, wherein the additional component slice is selected based on a target platform and a target function.

7. The system of claim 5, wherein generating the component slice sequence and constructing the wireframe is performed at least in part by a machine learning model.

8. The system of claim 5, wherein generating the component slice sequence and constructing the wireframe is performed at least in part by a GUI wireframe generative adversarial model (GWGAN), and generating the prototype is performed at least in part by a GUI style generative adversarial model (GSGAN).

9. A computer program product, the computer program product comprising:
a tangible storage medium readable by a processing circuit and storing instructions for execution by the processing circuit for performing a method comprising:
acquiring a draft wireframe representing a GUI design, the draft wireframe including one or more wireframe components;
decomposing the draft wireframe into one or more component slices, each component slice including a respective wireframe component of the one or more wireframe components;
generating a component slice sequence including the one or more component slices and at least one additional component slice selected based on the draft wireframe;
constructing a wireframe based on the component slice sequence; and
generating a prototype of the GUI design based on the constructed wireframe, wherein generating the component slice sequence is performed using a machine learning model including a generator, the generator configured to be trained by a first discriminator and a second discriminator, the first discriminator configured to train the generator based on discriminating between real component slice sequences from a training data set and component slice sequences output by the generator, and where the second discriminator is configured to train the generator based on discriminating between real wireframes from the training data set and wireframes constructed from the component slice sequences output by the generator.

10. The computer program product of claim 9, wherein generating the component slice sequence and constructing the wireframe is performed at least in part by a machine learning model.

11. The computer program product of claim 10, wherein the machine learning model is a generative adversarial model.

12. The computer program product of claim 10, wherein generating the component slice sequence and constructing the wireframe is performed at least in part by a GUI wireframe generative adversarial model (GWGAN), and generating the prototype is performed at least in part by a GUI style generative adversarial model (GSGAN).

* * * * *